May 4, 1971 L. C. LIEBSCHUTZ 3,577,326

PROCESS FOR MAKING A MAGNETIC DATA STORAGE ELEMENT

Filed July 12, 1968 2 Sheets-Sheet 1

INVENTOR
LYNN C. LIEBSCHUTZ

BY John S. [signature]

ATTORNEY 3,577,326

PROCESS FOR MAKING A MAGNETIC DATA STORAGE ELEMENT

Lynn C. Liebschutz, Endicott, N.Y., assignor to International Business Machines Corporation, Armonk, N.Y.

Filed July 12, 1968, Ser. No. 744,401
Int. Cl. C23b *5/32;* C23c *3/00;* H01f *41/14*
U.S. Cl. 204—43 2 Claims

ABSTRACT OF THE DISCLOSURE

A process of making a magnetic material in the form of a film on a conductive cylindrical substrate comprises applying an alternating current to the substrate to generate an alternating orienting magnetic field circumferentially about the substrate. The orienting magnetic field strength is adjusted to produce an isotropic magnetic layer on the substrate or at higher intensities produces films with circumferentially closed easy axis. The alternating current is applied concurrently with deposition of ferromagnetic films from an electrolytic or electroless ferromagnetic bath solution. In an electroless deposition system and the electrolytic system, a direct current applied to electroplate or to initiate and sustain deposition is isolated from the alternating orienting field energization. The alternating orienting current may be sinusoidal but is preferably a square wave and has a zero D-C component.

The invention herein described was made in the course of or under a contract with the Department of Defense.

BACKGROUND OF THE INVENTION

Field of the invention

This invention relates to a process for making ferromagnetic materials of the film type useful as storage or switching elements in electronic data processors, and particularly cylindrical storage elements of the type commonly known as plated wire.

Description of the prior art

In the process of making plated wire storage elements, a ferromagentic film is deposited from a metal salt solution onto a conductive cylindrical substrate. The process for depositing the ferromagnetic film may be electrolytic, electroless, or electro-electroless. In the electroplating process, the substrate is made the cathode of a cell and electrical energy is applied thereto and a suitable anode positioned in an electrolytic solution with the substrate. In the electroless process, the substrate is placed in an electroless solution in which reducing agents in the bath, by autocatalytic action, effect the deposition of the metals. In an electro-electroless system, the substrate is placed in an electroless bath and deposition is initiated by application of electric current to produce a "flash" deposition layer after which electrical energy applied to the substrate is reduced below the electroplating level or removed to allow the deposition to occur primarily at a rate controlled by the constituents of the electroless bath.

In the various plating techniques, magnetic orientation of the film is generally obtained by depositing the film in the presence of a magnetic orienting field. One well known technique employs Helmholtz coils to produce a film layer on a conductive wire in which the film has a preferred magnetic anisotropy parallel with the axis of the substrate, i.e. the film has a closed hard axis (CHA) orientation. The use of Helmholtz coils for CEA (closed easy axis) or isotropic film orientation has proved very impractical. A second technique uses a hollow cylindrical substrate through which a conductor is threaded. A direct current applied to the threading conductor generates a circumferential orienting field; however, the presence of the field current causes voltage drop along the substrate thereby disturbing the deposition process causing the film to have irregular magnetic properties. While the use of a hollow substrate with a threading conductor eliminates the problem of applying current to the substrate directly, this approach is size limited and the threading conductor is likely to be so small that a current required to generate a magnetic field in the range up to 10 oersteds cannot be achieved without causing damage to the conductor.

SUMMARY OF THE INVENTION

The broad object of this invention is to provide a process for depositing magnetic films on cylindrical substrates which does not require special substrate structure, which is not size or current limited, which will not disturb the deposition electrochemistry, and which will produce superior control of the magnetic orientation of the film, particularly bistable films with circumferential uniaxial anisotropy (i.e. having a closed easy axis), as well as isotropic magnetic films.

In accordance with this invention, the above objects are achieved by applying alternating electrical energy to the conductive substrate during deposition. The alternating electrical energy may be sinusoidal but preferably is substantially square wave energization. In either case, the alternating current is applied longitudinally (i.e. axially) to the substrate, and is electrically isolated from any other current applied to effect or control deposition. The amplitude of the energizing current must be above the threshold current necessary to produce a magnetic orientation, but less than the amplitude which will produce an electrical breakdown in the bath solution. A further requirement is that the field energizing current have a zero direct current component. With such a technique, quality magnetic films are readily produced on cylindrical substrates. Use of hollow substrates where extremely small wires are used may be circumvented. The use of square wave alernating current further provides a magnetic CEA film having very high uniaxial anisotropic properties.

In practicing the present invention, it was discovered that magnetic film orientation is affected by the geometry of the substrate. Where cylindrical substrates are used, it was found that with substrates having a length greater than one inch, there is a natural tendency for the deposited films to be oriented with a closed hard axis when no orienting field is applied. The present invention has the further capability of providing superior control in producing films which are isotropic without limiting the length of the substrate or modifying the geometry.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 2:
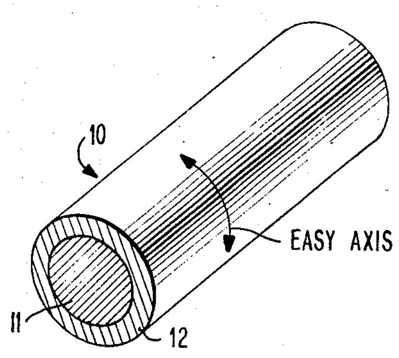
FIG. 2 is an isometric drawing of a magnetic storage element made in accordance with the process of the present invention.

As seen in FIG. 2, a storage element 10 made by the present invention comprises a cylindrical conductive wire substrate 11 on which is deposited a ferromagnetic layer 12. The substrate 11 is a conductive material such as beryllium-copper. The layer 12 is preferably a Ni-Fe alloy such as Permalloy having ratios of Ni-Fe in the range of 70 to 90 percent nickel, but preferably 75 to 82 percent. The diameter of the substrate is very small, being as little as 10 mils or less, and the film thickness may typically be in the order of from 5,000 to 20,000 angstroms. While the substrate is shown as a solid, it could also be a hollow cylinder of beryllium-copper, if desired, or it could take the form of a conductive layer such as gold or chromium deposited on a glass substrate or the like as shown in U.S. Pat. 3,240,686 of Harry E. Towner, issued on Mar. 15, 1966, and assigned to the same assignee as the present invention.

Figure 1:
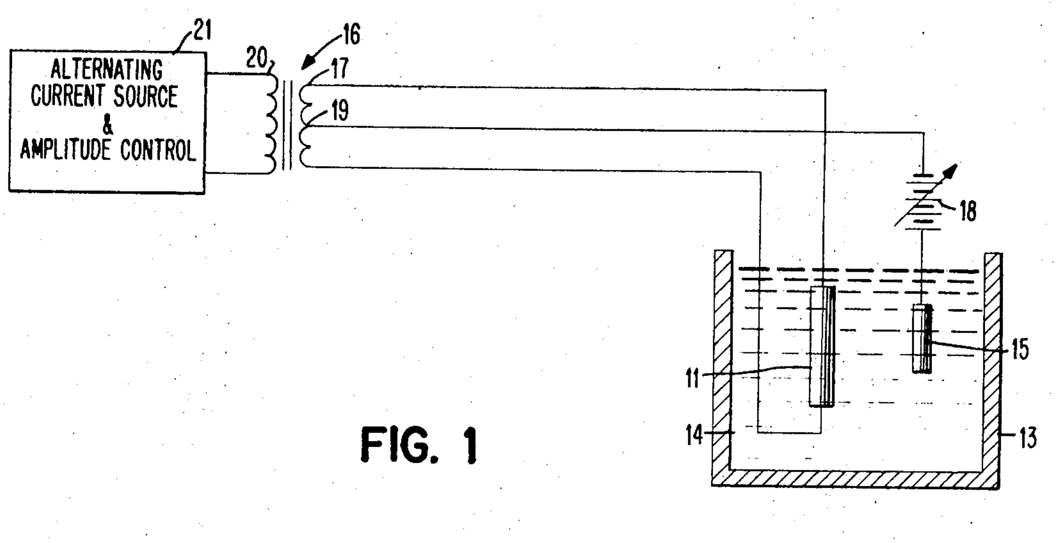
FIG. 1 is a simplified schematic of an apparatus used in practicing the present invention.

An apparatus for making the storage element 10 as shown in FIG. 1 comprises a tank 13 containing a bath solution 14. A conductive wire substrate 11 is immersed in the bath solution 14 along with an electrode 15. In accordance with this invention, the substrate 11 is connected at opposite ends to the secondary winding 17 of a transformer 16 which has a primary winding 20 connected to an A-C input and amplitude control device 21. For use in electro or electro-electroless plating, electrical connection is made from center tap 19 of winding 17 through a variable D-C source such as battery 18 to electrode 15.

In the preferred embodiment of this invention, the deposition of ferromagnetic layer 12 onto substrate 11 is accomplished in an electro-electroless system. Prior to deposition, the substrate 11 is first cleaned and polished in accordance with standard practices as referenced in co-pending applications of David W. Hall et al., filed on Apr. 28, 1967, Ser. No. 634,531 and Harold N. Rader et al., filed on Oct. 30, 1967, Ser. No. 678,890, both now abandoned.

The bath solution 14 for that system is an electroless bath comprising an aqueous solution of salts of nickel and iron, a reducing agent such as sodium hypophosphite in concentrations sufficient to reduce the metals at a rate which provides depositions of small grain size, a source of hydroxyl ions such as ammonium hydroxide in amounts sufficient to maintain the bath in the alkaline range. Such solutions further usually include a complexing agent such as a tartrate. Plating of layer 12 on substrate occurs preferably at bath temperatures in the range of 10–40° C.

Various bath formulations having the above, as well as other constituents, may be used; however, as more fully disclosed in the above Hall et al. and Rader et al. applications, the preferred formulations use nickel and iron salts wherein the ferromagnetic ions $Ni^{++}$ and $Fe^{+++}$ are brought into solution. Using the ferric ion provides a relatively stable bath which when operated within the low temperature ranges, approximating room temperature, provide a relatively stable long life bath for producing closely controlled Permalloy film deposits.

Another aspect of the electro-electroless system is that deposition of layer 12 on substrate 11 occurs without presensitizing of the substrate. To accomplish this, the substrate 11 is placed in the electroless solution 14 along with an electrode 15 which is made of material such as platinum or the like, which is chemically inert to solution 14. A direct current from battery 18 is then applied to the electrode 15, connected as an anode, of a magnitude sufficient to cause the Permalloy film to be electroplated on substrate 11. Following an initial period of electroplating, the direct current from battery 18 is reduced to a magnitude less than the electroplating level, whereupon plating continues autocatalytically at a rate controlled by the constituents of the bath 14. Alternatively, the direct current applied to electrode 15 may be reduced to zero by disconnecting battery 18 to allow plating completely electrolessly without any sustaining low level current.

During the course of the electro-electroless deposition onto substrate 11 from bath 14, an alternating circumferential orienting field is applied by connecting winding 17 of transformer 16 to the ends of the substrate 11. When so connected, the alternating current passes longitudinally through substrate 11 generating a circumferential magnetic field which alternates at the frequency rate of the alternating current source 21. The alternating current passing through substrate 11 has a zero D-C component. Thus, any voltage drop along the substrate is eliminated and deposition rate or distribution is not affected by the orientating field. By connecting the anode 15 through battery 18 to center tap 19 of transformer winding 17, the necessary direct current for electro-electroless deposition is applied to the system; however, with this connection, the alternating current and direct current are electrically isolated by virtue of having independent current paths.

While the preferred mode of making element 10 uses the deposition of a Permalloy film in an electro-electroless system illustrated in FIG. 1, the element 10 may also be made using electroless deposition approach. In that case, only substrate 11 connected to winding 17 is immersed in solution 10. Prior to immersion, substrate 11 is presensitized by treatment in a palladium-chloride solution (after degreasing and polishing) to deposit a light layer of palladium, as is well known and described in said Hall et al. and Rader et al. applications. After washing with water, the palladium coated substrate 11 is immersed in solution 14 initiating deposition of Permalloy film 12. An alternating current from source 21 through transformer 16 is applied to substrate 11 during deposition.

Figure 3:
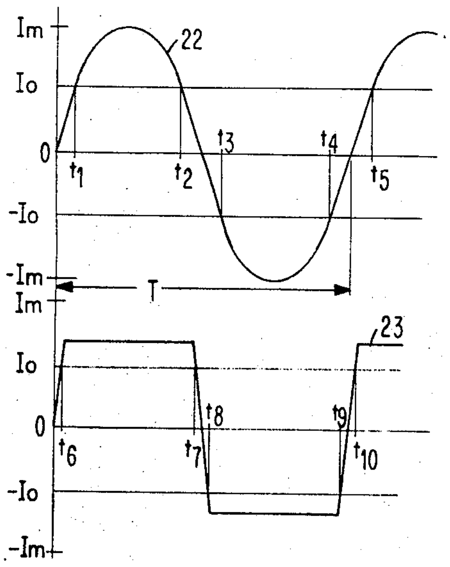
FIG. 3 is a graph showing two types of waveforms useful in practicing the present invention.

In practicing the present invention, the alternating current may be either a sinusoidal wave 22 but is preferably a square wave 23, as shown in FIG. 3. In the case of both the sinusoidal wave 22 and the square wave 23, the amplitude must exceed a threshold value $I_0$ but must not exceed the electrical breakdown $I_m$ of the bath 14. The threshold value $I_0$ is a variable depending on the particular alloys being used, however, it is generally understood to be the current necessary to generate an orienting field having a field strength equal to the easy axis coercivity of the film being plated. For example, $I_0$ for a film having a nickel iron ratio in which the nickel range is from 70 to 90 percent would generate a field strength sufficient to have an easy axis coercivity within the range of 2.0–4.0 oersteds. The peak value of the energizing waves 22 and 23 are indicated by the symbol $I_m$ which is estimated to be in the range for producing up to 30 oersteds of orientating field for electroless baths within the preferred ranges specified in the Hall et al. and Rader et al. applications.

As previously stated, in the preferred embodiment of this invention, the alternating square wave is used. One reason for this is that the square wave has a greater magnetic orienting efficiency. Referring to FIG. 3, in the sinusoidal wave 22, the time at which the sinusoidal current arrives at the threshold level $I_0$ is much later than for the square wave 23. Similarly, on the negative slope of the curves 22 and 23, the threshold value $I_0$ occurs sooner in the sine wave. Therefore, the alternating time interval $t_2-t_1$ for the sine wave 22 is much less than the orienting time interval $t_6-t_5$ of square wave 23. The same is true for the negative halves of the alternating wave cycles, $t_4-t_3$ of sine wave 22 is less than the interval $t_9-t_8$ of wave 23. Thus, using the square wave energization, greater orientation time is available than with the sine wave and the square wave technique may be considered more efficient. Also, the orienting intervals can be lengthened using square waves without danger of approaching the breakdown amplitude whereas the peak since wave value may be a limiting factor to increasing the orienting interval.

The time efficiency of the sine wave 22 may be expressed as follows:

$$E_{s1}=1-2/\pi \sin^{-1}\frac{I_o}{I_p} \quad (1)$$

where:

$I_o$ is the threshold current at which an orienting field strength is achieved equal to the anisotropy field of a magnetic film, and $I_p$ is the peak amplitude of the current wave.

The efficiency of the square wave may be expressed as follows:

$$E_{sq}=1-2\frac{t_r}{T} \quad (2)$$

where:

$t_r$ is the current rise time of wave 23 and

T is the period of oscillation.

Typical values are:

$E_{sq}=.98$
$E_{s1}=.62$.

for $f=1/T=2$ kHz.
$t_r=10$ microsec.
$I_o=5.6$ amps (RMS)
$I_p=10.0$ amps (RMS).

A further reason for preferring square wave energization of substrate 11 is that superior uniaxial anisotropic properties have been achieved in making a memory element 10 with closed easy axis. In fact, it was found that films 12 deposited from an electro-electroless system using square wave orientation produced orienting efficiency (i.e. uniaxiality) greater than that achieved with D-C (in a threaded substrated configuration) which is contrary to expectations when applied to the time efficiency expressions above. Actual magnetic orienting efficiency was determined by comparing the drive field of element 10 at zero flux coupling for the both hard and easy axes. Orienting efficiency may then be symbolized by the following expression:

$$E_o=\frac{H_{c1}-H_{c2}}{H_{c1}} \quad (3)$$

where:

$H_{c1}$ is measured coercivity of the easy axis of film layer 12 of element 10, and $H_{c2}$ is the hard axis coercivity of film layer 12 of element 10.

A number of samples of a storage element 10 were prepared in which a one micron thick Permalloy film 12 was deposited onto a conductive substrate 11. For comparison purposes, the substrates 11 were all hollow tubes of beryllium-copper having dimensions of 10 mils O.D. —5 mils I.D. and 2 inches long. In the case of the direct current field orientation, a copper wire conductor was threaded through the tubular substrate 11 and connected to a D-C power supply in usual manner. For alternating orientation of both types, the A-C connection was made to the substrate in the manner illustrated in FIG. 1. Following cleaning and polishing, the substrates were immersed in an electroless solution of the type illustrated in the above-mentioned Rader et al. application. Plating of layer 12 was achieved using an electroplating current of 10–20 milliamps for a period of 3 minutes after which current was reduced to a sustaining level for 0.5–2 hours. Direct current applied to the threading conductor for successive samples was from 0.5 to 4.0 amps. A-C sine wave energization for successive samples was in a range of 0 to 2.0 amps at a frequency of 2 kHz. Square wave energization for a series of samples was in the range of .9 to 2.0 amps at a frequency of 2 kHz.

Figure 5:
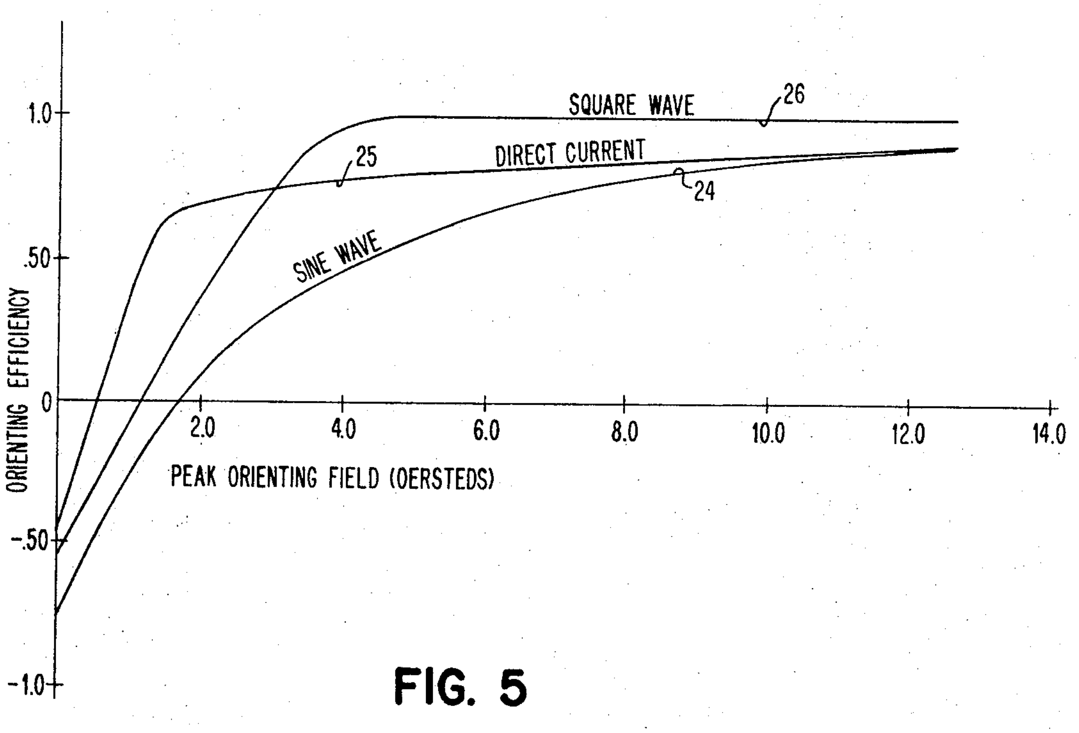
FIG. 5 is a graph showing experimental results of this process.

Each of the samples was tested by measuring the hard and easy axes coercivities ($H_{c2}$ and $H_{c1}$, respectively) using a 70 kHz. hysteresigraph and orienting efficiency was computed using the Formula 3 for $E_o$. The results of the tests are illustrated in FIG. 5. This graph shows that with sine wave energization, curve 24 approaches D-C energization efficiency curve 25 at much higher field strengths. Square wave efficiency, as shown by curve 26, while not increasing as rapidly as does the D-C, achieves a higher efficiency and more closely approximates uniaxiality than the D-C orientation. An added feature of the samples tested, it is noted that for the samples having a length of 2 inches, film layers 12 deposited in a relatively weak orienting field or zero orienting field have a magnetic orientation which produces a closed hard axis (CHA). It is believed that the layer 12 has demagnetizing fields due to the geometry of substrate 11 which tend to orient the layer 12 with a longitudinal easy axis. On the basis of this finding, in accordance with this invention, films 12 having isotropic properties can be obtained by applying circumferential orienting fields of a magnitude sufficient to balance the longitudinal demagnetizing fields, both axial and circumferential, in the film.

Figure 4:
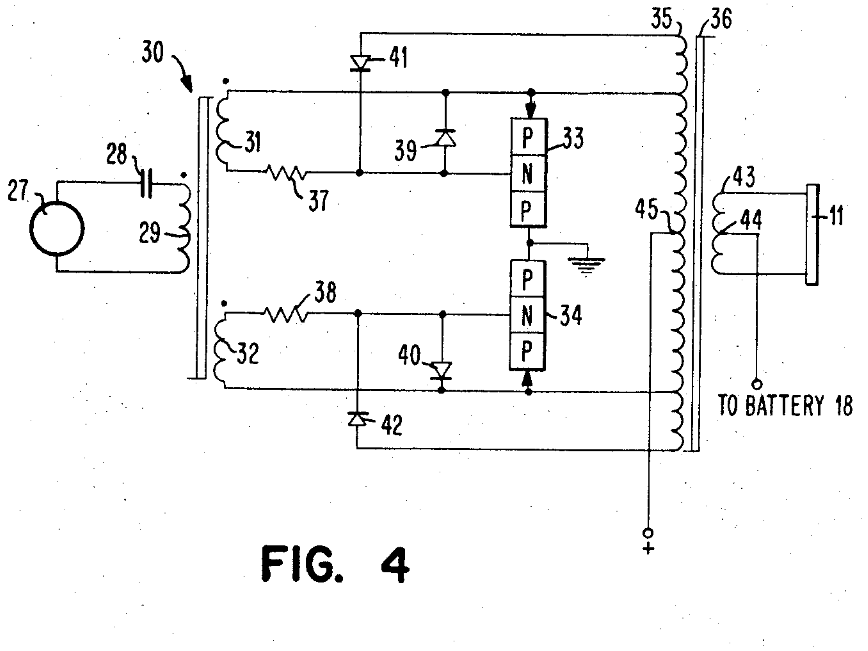
FIG. 4 is an electric circuit diagram of a square wave generator as applied to practice of this invention.

In FIG. 4, a circuit for providing a dual polarity square wave of the type shown in FIG. 3 is illustrated. Essentially, the circuit of FIG. 4 is a non-self excited DC to DC converter of known type. A single polarity pulse generator 27 having a signal with equal up and down time, has its output connected through capacitor to primary winding 29 of saturable core input transformer 30. The capacitor 28 and primary winding 29 are of a size designed to convert the single polarity signal into dual polarity pulses in primary winding 29. Input transformer 30 has dual secondary windings 31 and 32 which are connected to a pair of PNP transistors 33 and 34 having their collectors connected to ground. The secondary windings 31 and 32 are wound and connected to the transistors 33 and 34 so that a positive going signal in winding 29 produces a negative going signal in winding 31 and is connected across the emitter-base of transistor 33 while a positive going pulse in winding 32 is applied across the emitter-base of transistor 34. Thus, when a positive going pulse appears in winding 29 of transformer 30, a negative pulse is gated from transistor 33 to primary winding 35 of output transformer 36 while transistor 34 remains off. Conversely, when a negative going pulse appears in the winding 29 of transformer 30, a negative going pulse is gated by transistor 34 to primary winding 35 of output transformer 36. Resistors 37 and 38 are current limiters for their respective base circuits of the transistors. Diodes 39 and 40 are voltage limiters for their respective base-emitter circuits. Primary winding 35 of output transformer has added end windings connected in feedback circuits to diodes 41 and 42, respectively, for applying a biasing voltage in phase with the orienting signal in the primary winding 35 of output transformer 36 and applied to the bases of transistors 33 and 34 to prevent the respective transistors from turning on until the orienting signal has reached zero. The secondary winding 43 of output transformer 36 is connected across the substrate 11 while center tap connection 44 is made to battery 18 and anode 15, if desired. Amplitude control of the output signal is supplied by a center tap connection 45 from the primary of output transformer 35 to a direct voltage source.

While the invention has been described in connection with electroless and electro-electroless deposition systems, it is capable of being used in electroplating systems in which substrate 11 and electrode 15 are respectively cathode and anode of an electrolytic cell in which the solution 14 is electrolytic having metal salts in solution. Such solutions are well known in the art and include solutions of the type disclosed in the aforementioned Towner patent. In such a system, the alternating orienting field is applied to substrate 11 while D-C applied to anode 15 is electroplating energy for depositing a magnetic film of the Permalloy type. Once again, the arrangement illustrated in FIG. 1 provides electric isolation and the alternating current applied to substrate 11 has a zero D-C component in the same manner described for the preferred processes.

While the invention has been particularly shown and described with reference to preferred embodiments thereof, it will be understood by those skilled in the art that various changes in form and details may be made therein without departing from the spirit and scope of the invention.

I claim:

1. A process for making an isotropic Permalloy magnetic film on a conductive cylindrical substrate comprising:

depositing a Permalloy material onto said substrate from a bath solution containing nickel and iron salts; and subjecting the material as it is being deposited to a circumferential magnetic orienting field which is alternating and which is produced by applying an alternating current longitudinally to said substrate;

said alternating currenting having a zero D-C component;

said orienting field having a field strength sufficient to balance the axial and circumferential longitudinal demagnetizing fields of said film tending to produce anisotropy in said film.

2. A process in accordance with claim 1 in which said alternating current is a square wave.

References Cited

UNITED STATES PATENTS

| | | | |
|---|---|---|---|
| 2,955,959 | 10/1960 | DuRose | 117—93.2X |
| 3,001,891 | 9/1961 | Stoller | 117—93.2X |
| 3,027,309 | 3/1962 | Stephen | 204—43 |
| 3,092,510 | 6/1963 | Edelman | 117—238 |
| 3,240,686 | 3/1966 | Towner | 117—93.2X |
| 3,255,033 | 6/1966 | Schmeckenbecher | 117—93.2X |
| 3,261,711 | 7/1966 | Sallo | 117—93.2X |
| 3,272,727 | 9/1966 | Schmeckenbecher | 204—43X |
| 3,303,111 | 2/1967 | Peach | 117—130X |
| 3,305,327 | 2/1967 | Schmeckenbecher | 117—93.2X |

FOREIGN PATENTS

| | | | |
|---|---|---|---|
| 1,125,172 | 10/1956 | France | 204—45 |
| 1,396,114 | 3/1965 | France | 204—43 |
| 514,157 | 12/1930 | Germany | 204—228 |

GERALD L. KAPLAN, Primary Examiner

U.S. Cl. X.R.

117—130, 240; 340—174